Oct. 9, 1956     M. R. SEABROOKE     2,765,900

BEAD ORIENTING DEVICE

Filed March 25, 1955

INVENTOR.
MILTON R. SEABROOKE
BY
William J. Ruano
ATTORNEY

United States Patent Office 2,765,900
Patented Oct. 9, 1956

2,765,900

BEAD ORIENTING DEVICE

Milton R. Seabrooke, Mars, Pa.

Application March 25, 1955, Serial No. 496,783

8 Claims. (Cl. 198—33)

My invention relates to apparatus and a method for orienting ceramic beads of the so called "ball and socket" type, that is, tubular beads having a ball or convex portion at one end and a dished shape or concave portion at the other end, such as used for electrical insulation. However, the present apparatus and method is not confined to orienting beads but is equally useful for orienting other objects which are heavier at one end than at the other and wherein it is desired to align and orient the objects so that the same ends will face the same direction such as necessary in many manufacturing operations, packaging processes etc.

In the manufacture of tubular ceramic beads of the "ball and socket" type, such as used for electrical and instrument wiring insulation, it is necessary to align and arrange the beads in end to end relationship with the ball portion of one bead next to the socket portion of an adjoining bead. Beads are dumped in bulk into the bowl of a vibratory parts feeder, and are discharged therefrom in alignment at short intervals of time. By the law of averages, about half of them will have their convex ends pointing in one direction and the other half will have such ends pointing in an opposite direction. But it is necessary to rearrange the beads so that all convex ends will point in the same direction so as to enable the beads to be packaged in a tubular container and to be strung in readiness for use according to my invention.

While orienting devices are known in the art, none has been found suitable or practical for the orientation of ball and socket beads, particularly those of very small size, such as about $\frac{1}{10}$" in diameter and $\frac{1}{10}$" long. Such small sized beads have not been susceptible of orientation with known methods or devices and as the result it has been necessary to orient them by hand, which is exceedingly tedious and time consuming and which considerably increases their manufacturing cost.

An object of my invention is to provide a novel bead package unit.

An object of my invention is to provide a novel apparatus and method of orientation useful for automatically and rapidly orienting small beads of the ball and socket type as well as other elements that are heavier at one end than at the other.

A more specific object of my invention is to provide, in combination with a vibratory parts feeder of known type, an inclined chute equipped with orienting means embodying the present invention which will easily and very rapidly, as well as automatically, orient beads or other elements traveling down the chute so that corresponding ends will face in the same direction.

A still further object of my invention is to provide a novel apparatus and method of orientation which involves only a small fraction of the cost normally involved for orientation by known methods and apparatus and requiring only a small fraction of the normally required time for orientation.

Other objects and advantages of my invention will become apparent from a study of the following description taken with the accompanying drawing, wherein.

Figure 1:
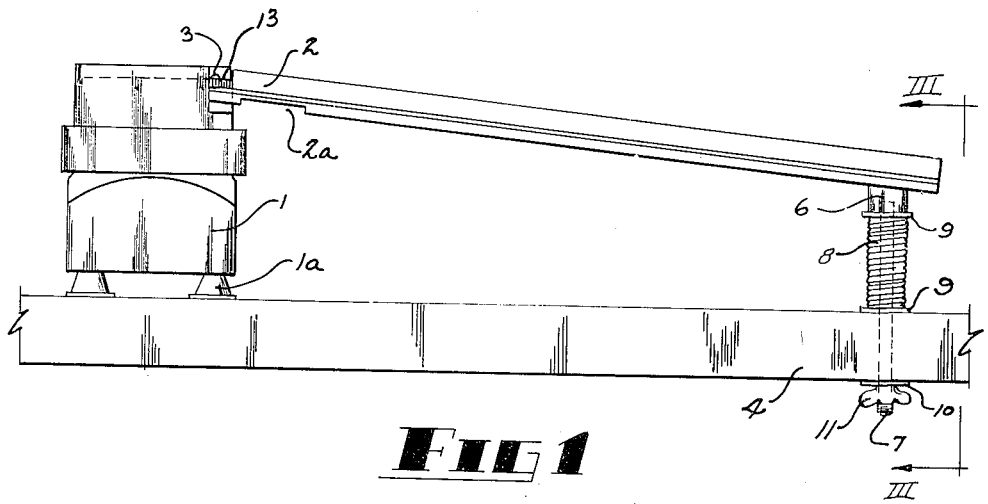
Figure 1 is a side elevational view of an orienting device for orienting ball and socket type beads or other articles which are heavier on one end than at the other, and embodying the principles of my invention.
Figures 2, 2A, 6:
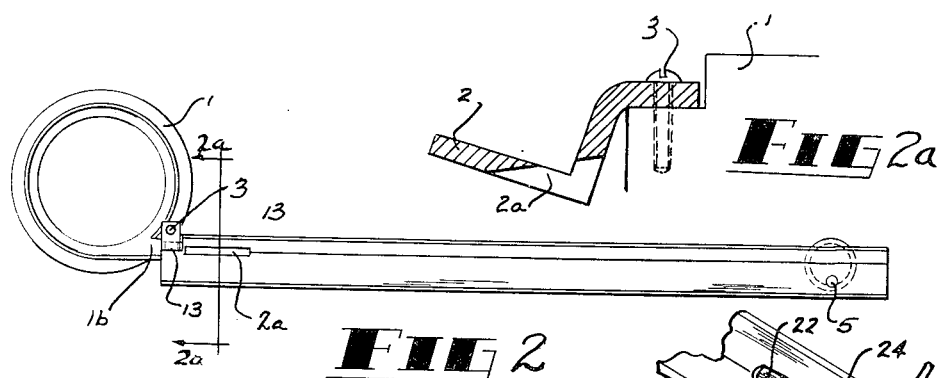
Figure 2 is a top or plan view of the device shown in Figure 1.
Fig. 2a is a cross section taken along line 2a—2a of Fig. 2.
Figures 3, 4, 5:
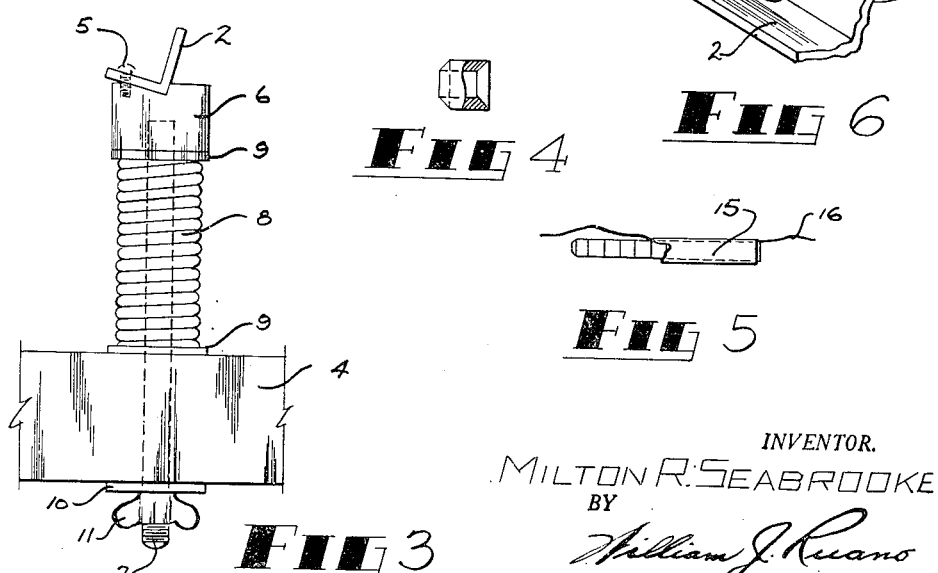
Figure 3 is an end view taken along line III—III of Figure 1.
Figure 4 is a side view, with a part shown broken away, of a tubular ceramic bead of the ball and socket type, having one end convex shaped and the other, concave shaped.

Figure 5 is a bead package unit, with the cover shown partly broken away, including oriented beads of the type shown in Figure 4, assembled and packaged for use in industry; and Figure 6 is a fragmentary perspective view of a portion of the chute shown in Figures 1 and 2 but equipped with a modified form of orienting means involving the use of an air jet for spinning beads around if they are not facing the desired direction.

Referring more particularly to Figures 1 to 3 of the drawing, numeral 1 denotes a vibratory, parts feeder of well-known construction, such as that known in the trade as a "Syntron" parts feeder manufactured and sold by The Syntron Company of Homer City, Pennsylvania.

Such "Syntron" vibrator feeder comprises essentially a spring mounted bowl having a helical spiral ledge along the inner wall surface thereof, whereby parts dumped into the bowl will be fed upwardly along a helical spiral path as the result of slight rotary vibratory motion of the feeder. Such motion may be obtained as the result of half wave rectification of a 60 cycle alternating current source which will energize electromagnets and produce vibrations of 3,600 per minute on an inclined chute bolted securely to the bowl. The frequency and amplitude of the vibrations may be varied to suit the particular size of the parts fed. Suffice it to say, for the purposes of the present invention, that the parts feeder 1 is a well-known device for discharging parts, such as beads of the ball and socket type, in quick succession, but not oriented, onto a chute 2 rigidly bolted to the parts feeder. Chute 2 is preferably made of metal, such as aluminum, having an angular cross section as shown more clearly in Figure 3. Chute 2 may be made from a flat bar of aluminum 1½" wide, 1" thick and (for .20" beads) about 24" long. As will be more apparent in Figure 3, chute 2 is preferably arranged so that one side thereof is at about an angle of 15° from the vertical, whereas the other side is at an angle of about 75° from the vertical. The groove may be machined V-shape ½" deep at its apex. The angular disposition of chute 2 may be varied in some instances, depending upon the type of articles to be slid down the chute. The chute is roughly 100 to 150 times as long as the bead.

The upper end of chute 2 is provided with a machined surface and a tight fit with the parts feeder, which end is clamped thereto by a bolt 3 so as to vibrate in unison therewith. The discharge outlet 1b of parts feeder 1 is slightly higher than the apex of chute 2 by about $\frac{3}{32}$" for beads of .20" in length. The drop will be slightly different for other sized beads or for other articles to be oriented.

Since in the manufacture of ceramic beads there usually develops a considerable quantity of small particles of broken beads or parts of ceramic material from which the beads are made, either as the result of careless handling, worn dies or broken beads, endless difficulty would be caused in orientation unless some satisfactory means is employed for disposing of such small particles. This problem has been solved by making a slot 2a along a portion of the apex of chute 2, for example, a slot .15" wide at the bottom and about 3" long along the chute and beginning about ½" from the receiving end of the chute. Thus particles of size smaller than .15", for example, will drop therethrough, whereas full sized beads of .20" in diameter will slide beyond the slot. A container (not shown) is positioned underneath the slot to receive the small or broken particles of ceramic.

The chute 2 is inclined with respect to the horizontal in the range of between about 0° and 30°, preferably about 15° for beads of .20" diameter. The lower end of chute 2 is resiliently mounted on a table 4 by means of a threaded rod 7 rigidly secured to the lower end of the chute 2 by being threaded to an aluminum block 6 fastened to the chute by screw 5 and having a saddle portion machined out to provide the proper 90° angle to receive the triangular chute. Rod 7 is surrounded by a coil spring 8 having washers 9 at the ends thereof and a washer 10 adjacent an adjusting wing nut 11. Thus as the adjusting nut 11 is turned, the lower end of the chute may be adjustably lowered so as to cause greater compression of spring 8. For smaller beads, spring 8 is compressed to decrease the vibration intensity since smaller beads require less vibration than larger ones.

The parts feeder 1 is mounted on rubber mounts 1a which rest on table 4 and are not rigidly attached thereto in order to permit the parts feeder 1 to freely vibrate. About 1 inch away from the discharge outlet 1b of the parts feeder bowl 1 there are disposed a plurality of roughened marks 13 which are formed on the substantially vertical flange of the chute 2. These roughened marks extend from the apex of the flange upwardly at right angles to the substantially horizontal flange for a height of about ¼" along the substantially vertical flange. About 8 roughened marks or slight grooves spaced about .12" apart will suffice for beads of .20" diameter. The rest of the length of chute 2 is highly polished, a final polish being obtainable by jewelers' rouge or the like.

The principle involved in orienting ball and socket beads involves the utilization of vibration as well as the unequal weight distribution of the bead itself. The bead being concave and therefore lighter at one end than the rounded or convex end, the tendency, when vibrated, is to rest on the heavier or weighted end. As the feeder bowl 1 vibrates the chute 2 firmly clamped thereto so as to discharge beads at spaced intervals, some beads discharged from bowl 1 will have their convex ends first, others will have their concave ends first as they enter the chute. However, as they slide down the chute and come in contact with the roughened marks 13, only the heavy end will maintain contact with the chute and tend to be arrested by the marks, while the lighter or concave end will be free and will turn or flop over through an angle of 180° so that all of the beads will eventually become oriented in a manner so that all the concave ends will face the discharge or lower end of the chute. As viewed from the top of the chute, as a leading convex (or heavier) end approaches and contacts the roughened marks 13, it is temporarily arrested thereby or retarded, therefore the bead will turn on the inner surface of the substantially horizontal flange of chute 2 in a counter-clockwise direction and become properly oriented with the concave end facing the discharge or lower end of the chute because such concave end is kept raised from chute 2 due to vibration, and because of greater weight of the convex end, the latter remains in a substantially fixed position during this rotating motion as a consequence of the anchoring effect of roughened marks 13. Of course if the concave end were the leading end it, being free of the chute, will move past the roughened marks 13 and the later contact of the convex end with the roughened marks will merely retard but not turn the bead.

It should be noted that this principle of orientation is not confined or restricted to orienting ball and socket beads, but may be employed for orienting other shapes of elements having unequal weight distribution, that is, so long as the elements are heavier at one end than at the other. As the result of vibration and sliding of such elements by the roughened marks, all elements facing the wrong way, that is with their heavy side forward, will be turned 180°, whereas elements facing the right way, that is with their light end forward, will continue to move in the same direction.

Therefore, after the beads of the ball and socket type, previously referred to, have passed the roughened marks 13 and the opening 2a so as to discharge broken particles, they will all be oriented, that is their concave ends will all face downwardly, so that the beads may be discharged from the bottom end of the chute with correct orientation and may be strung on a wire or cord to form a package unit or may be slid into a carboard tube, such as 15, in Figure 5, containing a longitudinally extending string 16 which is positioned between the tube and beads and projects slightly beyond the ends of the tube, so that when it is desired to remove the beads from the tube, such as after the packaged beads are slid onto an electrical conductor to be insulated by the beads, the string is pulled so as to cut open the tube longitudinally and enable it to be removed from the beads. While a cord or wire extending through the bores of the beads is not needed in the package unit shown in Figure 5, in some instances it may be used.

A modification of the invention is shown in Figure 6 wherein instead of scored lines for rotating, about a transverse axis, beads which do not face in the right direction, there is employed, instead, an air jet or nozzle 21 for this purpose. At a point about 2" beyond the discharge outlet 1b of the parts feeder 1 the air jet or nozzle 21 may be angularly mounted and its mounting may be adjustable to provide an adjustable angle with respect to the bead bore axis. The angle of the air nozzle is preferably about 15° off the bead bore long axis and inclined downwardly about 30° with respect to a horizontal plane extending through the bead bore long axis.

The nozzle 21 has an orifice sized for the particular size bead being handled and the air stream is regulated by a diaphragm regulator similar to but more sensitive than regulators used in gas welding. For small beads, such a small orifice is required that bottled carbon dioxide may be used to insure a constant even flow of air. Compressed air using commonly known water and dust traps can cause a slight deflection of the air stream due to foreign matter in the orifice, which prevents proper functioning of the equipment.

The air stream should strike the bead at a point 22 beyond the bead bore and above the axis, within the 90° to 180° angular range.

Care must be exercised in adjusting the ejection rate of the Syntron parts feeder to provide at least ¼" separation between the small beads at the point of the air stream otherwise the proper orienting action will not be obtained.

As the beads come from the parts feeder, according to the law of averages about half will have their rounded end first and the other half will have their concave or cup shaped end first. When a bead with the rounded end first encounters the air jet or stream, the shape of the bead will deflect the air and the bead will remain in the same position and continue to move down the chute by gravity. However, when a bead, with its cup shape end first, meets the air stream, the cup traps the air stream and the bead is spun about an angle of 180° while sliding on the horizontal flange of chute 2, until finally the convex shaped end becomes the leading end as the bead continues its travel down the incline. In this manner all the beads are oriented so that all the convex ends will face downwardly of the incline in the same direction. From this incline the beads may enter a glass tube or perhaps a cardboard tube 15 and packaged as shown in Figure 5 as described above.

The air stream may be sufficiently strong so as to blow off the chute beads with leading concave ends. Such beads may be collected underneath the chute and returned to the parts feeder.

Thus it will be seen that I have provided an efficient apparatus and method for orienting ceramic beads of the ball and socket type, or, in fact, any other element which is heavier on one end than at the other, which enables very rapid orientation, without human intervention, of large quantities of beads or other elements at very low cost; furthermore I have provided a novel method and apparatus for automatically effecting turning movement of beads, or similar elements, which are not facing in the right direction while being discharged down a chute, which orienting means comprises either a frictional surface or an air jet applied to a vibrating chute; furthermore I have provided an orienting method and apparatus that provides an amazing increase in the speed of production, requiring only a small fraction of the time previously required by conventional methods; also I have provided a highly efficient and practical bead package unit which is highly useful in electrical and other industries.

While I have illustrated and described several specific embodiments of my invention, it will be understood that these are by way of illustration only, and that various changes and modifications may be made within the contemplation of my invention and within the scope of the following claims.

I claim:

1. Apparatus for orienting articles which are heavier at one end than at the other, comprising a vibratory parts feeder, a chute having one end rigidly secured to the discharge opening of said parts feeder, whereby articles are discharged onto the chute at spaced intervals while the chute is vibrating, and means mounted on one side portion of the chute for influencing the leading end and reversing the direction of articles which are not properly oriented, said means comprising a roughened inner wall surface portion formed by laterally extending scored lines disposed on one side of the chute for frictionally retarding the heavier end of said articles while the lighter ends thereof are turned 180° on the other side portion of the chute.

2. Apparatus for orienting articles which are heavier at one end than at the other, comprising a vibratory parts feeder, a chute having one end rigidly secured to the discharge opening of said parts feeder, whereby articles are discharged onto the chute at spaced intervals while the chute is vibrating, and means mounted on one side portion of the chute for influencing the leading end and reversing the direction of articles which are not properly oriented, said means comprising an air jet for directing air under pressure against the leading end of said articles.

3. Orienting apparatus for small articles which are heavier at one end than at the other, comprising a vibrating and feeding device for discharging said articles from the discharge end thereof at substantially equally spaced intervals, a chute of angular cross section extending downwardly from said discharge end at an angle of 0° to 30° with respect to the horizontal plane of said discharge end, spring means for resiliently supporting the lower end portion of said chute, and means for adjusting the tension of said spring means so as to vary the amplitude of vibration of said chute, means mounted on one of the flanges of said chute adjacent said discharge end for influencing the leading end and effecting reversal of articles by turning them 180° on the other flange if they are facing in the wrong direction while sliding down the chute.

4. Apparatus as recited in claim 3 wherein said last named means comprises a plurality of spaced parallel score marks formed on one of said flanges adjacent said discharge end and extending transversely of the path of said articles for frictionally retarding movement of the heavier ends of said articles while the lighter ends are permitted to turn about an angle of 180° on the other flange of said chute.

5. Apparatus for orienting articles which are heavier at one end than at the other, comprising a vibratory parts feeder, a chute having one end rigidly secured to the discharge opening of said parts feeder, whereby articles are discharged onto the chute at spaced intervals while the chute is vibrating, and means mounted on one side portion of the chute for influencing the leading end and reversing the direction of articles which are not properly oriented, said means comprising a nozzle for directing air under pressure against one end of said articles so that articles having a leading cup shaped end will be reversed in direction by said jet of air.

6. Apparatus as recited in claim 3 wherein one of said flanges of said chute is disposed at an angle of about 15° with respect to a vertical plane extending through the apex of said chute and the other flange of said chute being at an angle of about 75° with respect to said vertical plane.

7. Orienting apparatus comprising a vibratory device for discharging, at spaced intervals, tubular ceramic beads having a convex end and a concave end, a chute having one end rigidly secured to the discharge end of said device for receiving said beads at spaced intervals, said chute having angular side flanges and inclined downwardly from said discharge end at an angle of about 15°, spring means for yieldingly supporting the lower end portion of said chute, adjusting means for adjusting the tension of said spring and thereby the amplitude of vibration of said chute, one of the side flanges of said chute being substantially vertical and the other, being substantially horizontal, the substantially vertical flange having a roughened portion immediately adjacent said discharge and for frictionally holding the convex end of said beads while the concave ends are permitted to turn 180° about said substantially horizontal flange, whereby all the beads will eventually face in the same direction, that is, with their concave ends facing downwardly of the chute.

8. Apparatus as recited in claim 7 wherein said roughened portion comprises a plurality of spaced parallel grooves extending substantially vertically on said substantially vertical flange adjacent said discharge end.

References Cited in the file of this patent

UNITED STATES PATENTS

| 2,361,111 | Light | Oct. 24, 1944 |
| 2,594,287 | Budd | Apr. 29, 1952 |
| 2,609,914 | Balsiger et al. | Sept. 9, 1952 |
| 2,625,282 | Nekarda | Jan. 13, 1953 |
| 2,700,450 | Sulger | Jan. 25, 1955 |
| 2,706,039 | Springate | Apr. 12, 1955 |

FOREIGN PATENTS

| 479,676 | Canada | Dec. 25, 1951 |
| 699,364 | Great Britain | Nov. 4, 1953 |